(12) United States Patent
Ang

(10) Patent No.: US 6,678,799 B2
(45) Date of Patent: Jan. 13, 2004

(54) AGGREGATION OF CACHE-UPDATES IN A MULTI-PROCESSOR, SHARED-MEMORY SYSTEM

(75) Inventor: Boon Seong Ang, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 308 days.

(21) Appl. No.: 10/002,993

(22) Filed: Oct. 18, 2001

(65) Prior Publication Data

US 2003/0079085 A1 Apr. 24, 2003

(51) Int. Cl.$^7$ ............................................. G06F 12/00
(52) U.S. Cl. ...................... 711/141; 711/133; 711/147
(58) Field of Search ........................... 709/213; 711/130, 711/133, 141, 147, 156

(56) References Cited

U.S. PATENT DOCUMENTS

| | | | | |
|---|---|---|---|---|
| 5,924,119 A | * | 7/1999 | Sindhu et al. | ............... 711/141 |
| 6,484,242 B2 | * | 11/2002 | Hosoya et al. | ............... 711/144 |
| 2002/0112130 A1 | * | 8/2002 | Arimilli et al. | ............. 711/141 |

OTHER PUBLICATIONS

C. Amza, A.L. Cox, S. Dwarkadas, P.Keleher, H. Lu, R. Rajamony, W. Yu, and W. Zwaenepoel, *Treadmarks: Shared Memory Computing on Networks of Workstations*, IEEE Computer, vol. 29, No. 2, pp. 18–28, Feb. 1996.

* cited by examiner

*Primary Examiner*—Donald Sparks
*Assistant Examiner*—Christian P. Chace

(57) ABSTRACT

Method and arrangement for cache management in a shared memory system. Each of a plurality of intercoupled processing nodes includes a higher-level cache and a lower-level cache having corresponding cache lines. At each node, update-state information is maintained in association with cache lines in the higher-level cache. The update-state information for a cache line tracks whether there is pending update that needs to be distributed from the node. In response to a write-back operation referencing an address cached at a node, the node generates difference data that specifies differences between data in a cache line for the address in the higher-level cache and data in a corresponding cache line in the lower-level cache. The difference data are then provided to one or more other nodes with cached versions of the cache line for the address.

28 Claims, 5 Drawing Sheets

AGGREGATION OF CACHE-UPDATES IN A MULTI-PROCESSOR, SHARED-MEMORY SYSTEM

FIELD OF THE INVENTION

The present invention generally relates to cache coherency in multiprocessor data processing systems, and more particularly to cache coherency in systems that implement weak memory models.

BACKGROUND

Multi-processor data processing systems harness the collective computation power of a multitude of processors. The memory system is central to a multi-processor system and must be scalable in order to provide sufficient bandwidth to each processor while sharing data between the multiple processors. For certain applications, an efficient means of sharing data is critical to effective collaboration between the multiple processors.

Cache coherence must be addressed in multi-processor systems with shared memory. Cache coherence protocols address the issue of ensuring that no processors in the system are using stale data in the local caches. In general, stale cache entries can be eliminated by either invalidating in the caches all but the most recently updated cache data or updating the caches with the most recent data. In a system using the invalidation protocol, an attempt to access an invalidated memory location from cache will cause the processor to read a copy of the most recent data either from another cache or from main memory. In the update protocol, following a write operation all the caches having a cached version of the data are updated with the most recent data. Thus, the most recent data are available in the caches.

The memory model implemented in a multi-processor system also influences system performance and cache coherence design. Generally, there are two types of memory models: strong memory models and weak memory models. The strong memory model is also referred to as the sequential consistency memory model. The sequential consistency comes from the requirement that all processors in the system must see all memory operations as occurring in the same relative order. Sequential consistency constrains the implementations of both the cache-coherence protocol and the memory system.

Weak memory models do not require the strong guarantee of sequential consistency for all its memory accesses. Instead, code running on one processor that is producing data for another processor will explicitly indicate to the other processor that data are ready. This indication is done using synchronization operations. The data resulting from store operations by one processor prior to a synchronization operation are not expected to be read by another processor until after the synchronization operation occurs. The relative order of the store operations is immaterial to the other processor. However, by the time a processor sees the synchronization operation, the processor must no longer see any of the old data that have been overwritten by the store operations that preceded the synchronization operation. Weak memory models permit higher-performance implementations.

While most current hardware cache-coherence implementations adopt some form of invalidation protocol, certain data sharing patterns trigger very bad performance with invalidation protocols. An example pattern is where one or more processors read or write a cache-line during the time another processor is storing to that cache-line. This pattern occurs even for what is called false sharing, where the former processors are using parts of the cache-line that are not being stored to by the latter processor. Update-based protocols with multi-writer support deal well with false sharing. False sharing typically becomes more serious with larger cache-lines. With the present trend toward larger cache-lines, false sharing is expected to become a more serious problem over time.

Many hardware-based shared memory systems implement a version of the invalidation-based cache coherence protocol because update-based systems, as generally implemented, create much overhead. The overhead created in an update-based system is caused by broadcasting or multi-casting an update message, in response to each store operation, to all caches that potentially could have copies of the data. In particular, if a processor performs several store operations to the same cache-line, current implementations send update messages for each store operation. This results in a large number of update operations, thereby impairing system performance.

A system and method that address the aforementioned problems, as well as other related problems, are therefore desirable.

SUMMARY OF THE INVENTION

The invention provides various arrangements and method for cache management in a shared memory system. Each of a plurality of intercoupled processing nodes includes a higher-level cache and a lower-level cache having corresponding cache lines. At each node, update-state information is maintained in association with cache lines in the higher-level cache. The update-state information for a cache line tracks whether there is pending update that needs to be distributed from the node. In response to a write-back operation referencing an address cached at a node, the node generates difference data that specifies differences between data in a cache line for the address in the higher-level cache and data in a corresponding cache line in the lower-level cache. The difference data are then provided to one or more other nodes with cached versions of the cache line for the address.

Various example embodiments are set forth in the Detailed Description and Claims which follow.

BRIEF DESCRIPTION OF THE DRAWINGS

Various aspects and advantages of the invention will become apparent upon review of the following detailed description and upon reference to the drawings in which.

DETAILED DESCRIPTION

Figure 1:
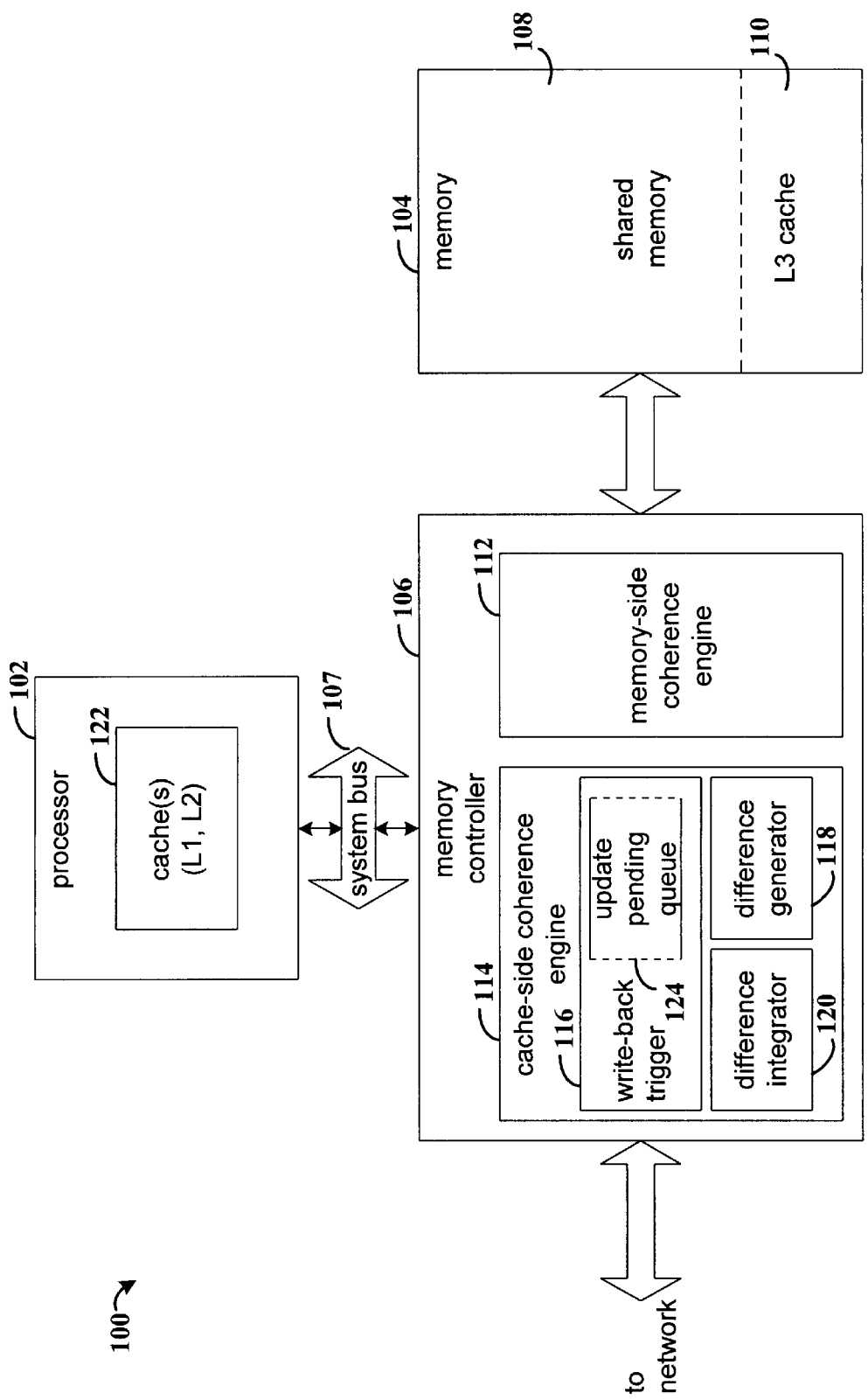
FIG. 1 is a functional block diagram that illustrates a node that includes a processor, memory, and memory controller in accordance with one embodiment of the invention.

FIG. 1 is a functional block diagram that illustrates a node 100 that includes a processor 102, memory, 104, and memory controller 106 in accordance with one embodiment of the invention. The processor is coupled to the memory controller by system bus 107. Node 100 is one node in a directory-based, distributed shared-memory parallel processing system.

Memory 104 includes a shared memory portion 108, which is the portion of the total shared memory in the system that is managed by memory controller 106. Another part of memory 104 is the L3 cache for processor 102. The present invention is not limited to systems having L3 caches as will be explained later in the discussion.

Memory controller 106 includes two main function blocks for distributed cache coherence management. Memory-side coherence engine 112 performs tasks related to memory hosted at node 100, such as maintaining directory and multicasting invalidation or update messages. Node 100 is referred to as the "home node" for addresses hosted in shared memory 108. Cache-side coherence engine 114 undertakes tasks related to cache-lines brought into this node from global memory. These tasks include acquiring a copy of a cache-line upon cache-miss, writing back a cache line to the home node when the cache line is purged, invalidating a local copy of a cache line in response to an invalidation message from another node and other assorted tasks.

In another embodiment, there is no fixed home node for a memory address. For example, systems implemented according to the cache-only memory architectures (COMA) have no fixed nodes for memory addresses.

Cache-side coherence engine includes write-back trigger 116, difference generator 118, and difference integrator 120 for managing coherence operations with other nodes. Write-back trigger 116 tracks which of the cache-lines in the higher-level cache (L2 cache 122) have been modified in order to maintain coherence with other nodes relative to updates and synchronization operations. The updates are tracked in update-pending queue 124 by cache line identifiers, which in an example embodiment are implemented as a form of the cache line addresses. The present invention assumes a synchronization instruction that may be initiated by software executing on the processors at the nodes in the system. Execution of the instruction results in a synchronization bus operation.

In an example embodiment, each synchronization operation is named using a specific memory location as the name. This allows the exact implementation of the memory model's ordering requirement to be more aggressive in exploiting overlap in time between update propagation and synchronization operation propagation.

Difference generator 118 generates difference data and distributes the difference data in update messages. The difference data describe differences between an updated cache line in one level and the corresponding cache line at the next higher cache level. Those skilled in the art will appreciate that "higher" level caches are nearer the processor in a storage hierarchy than are "lower" level caches. The difference data are generated in response to a write-back operation. A write-back operation is a bus operation initiated from the processor-cache arrangement 102 (also "processor-cache complex") to write a modified cache line back to a lower-level cache(s) or memory outside the processor-cache arrangement 102. The write-back operation includes the address and the data to be written back.

Difference integrator 120 processes incoming update messages which contain difference data by purging old copies of the cache line in the L1 and L2 and updating the cache line in the L3 cache. During this process, if L1 or L2 caches hold a modified copy of the cache line, the modified copy is written back to the L3 cache as part of the purge, before the update to the L3 cache is performed. This is to ensure that if two nodes, node A and node B, modify different parts of the same cache-line, updating will effectively merge these changes. For example, if node A modifies the first byte and node B the fifth byte, the goal is for an update from node A to node B to cause the incorporation of the new first byte value to node B's cache copy, while at the same time preserve the modification that node B has already made to the fifth byte of the cache line.

In one embodiment, the L3 cache is organized such that the same physical addresses for the same logical cache-line is used throughout the entire system. In an alternative embodiment, a Simple Cache-only Memory Architecture (S-COMA) is implemented, wherein the same logical cache-line may be identified by different physical addresses in each node. The S-COMA architecture includes a mechanism for translating between the logical and physical addresses.

The present invention reduces bandwidth requirements by aggregating into one update messages store operations to the same cache-line that happen close together in time. In an example embodiment, an update message is generated when a dirty cache line is being written back to main memory. The memory controller is used to initiate the update message.

One characteristic of this organization is the presence of an original, unmodified copy of the cache-line in a lower-level cache. The memory controller compares the data in the lower-level cache to the cache line to be written back, thereby identifying the portions of the cache line that have been updated. The invention supports reconstruction of the portions of a cache-line that have been overwritten, without requiring individual update messages for each store to the cache line. The resulting difference data are then distributed to other nodes having the cache line. In a directory-based shared memory system, the memory controller has direct access to directory information which tracks which nodes have which cache lines.

In one embodiment, the directory is centrally stored at the home node, and all coherence traffic passes through the home node. In another embodiment, the directory is distributed. For example, a linked list links all the cache-entries holding the same cache-line.

When the L3 cache is implemented with DRAM technology, computing the difference data requires little additional overhead. In DRAM memory technology, a read operation destroys the data in memory cells. In order that data is not lost, what appears externally as a single read operation is actually a read followed by a write of the just-read data to restore the data. If it is known that new data should be written back to location that is just read, an optimized read-write pair operation can be performed. Internally, the read is not followed by a write of the original data, but a write with new data. As such, paired operations involving a read followed by a write to the same memory location in a DRAM can be performed in about the same amount of time as either a read alone or a write alone. Generating the difference data exploits such paired operations and therefore adds little overhead to updating DRAM-implemented lower-level caches at the source of the update.

The embodiment of FIG. 1 uses an update-pending queue to track the update-state of the cache lines in the L2 cache. In another embodiment, the L2 cache tracks the update-state for the cache lines in the L2 cache. Each cache line has an associated storage element, for example, a memory cell, that indicates whether the associated cache line has been updated and whether coherency is maintained using an update protocol. This update information is provided to the difference generator 118 to initiate generation of difference data when a write-back occurs. In response to a synchronization operation, the L2 cache searches through its cache lines for those cache lines having update states that indicate updates are pending and forces update operations for the identified cache lines.

Figure 2:
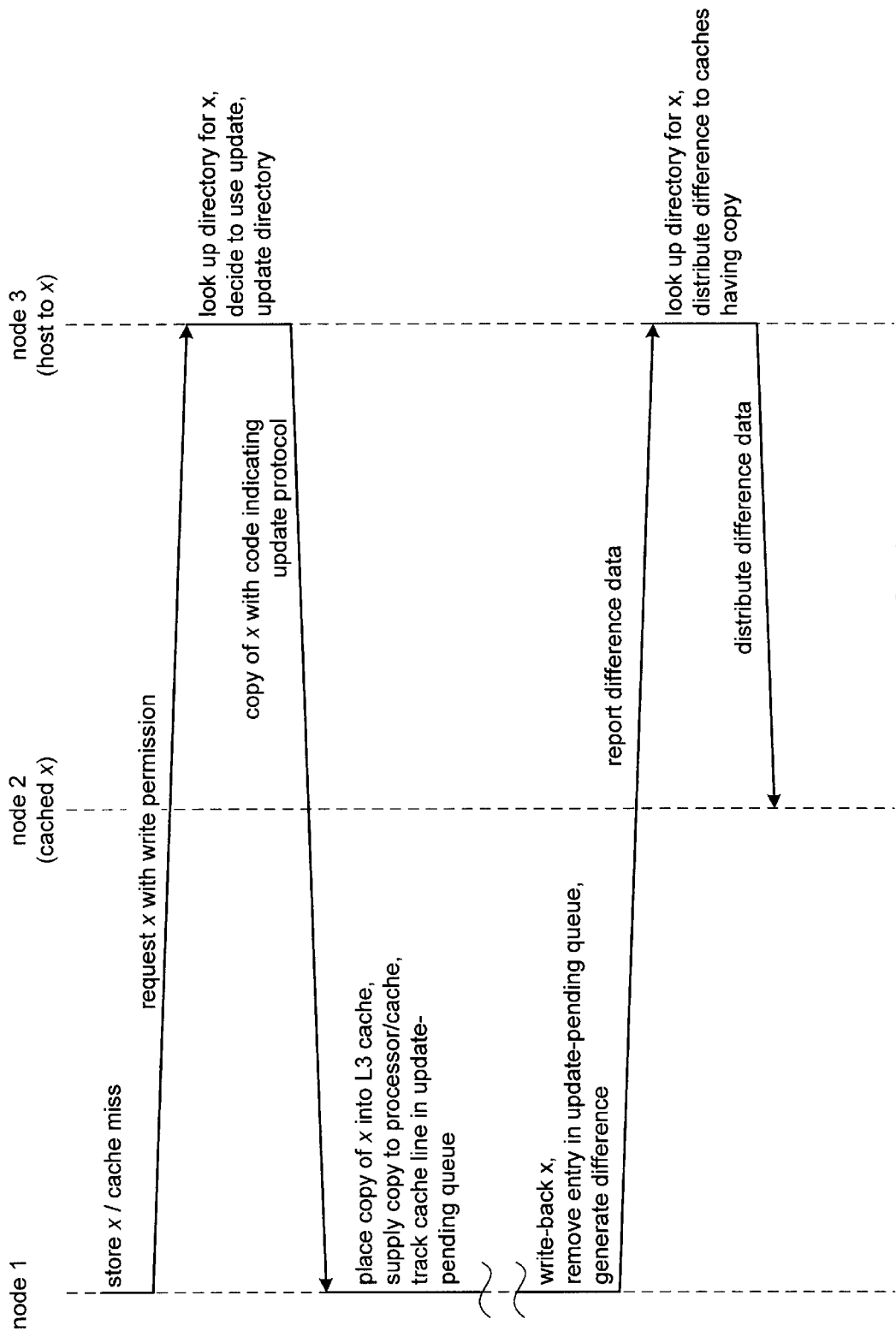
FIG. 2 is a event diagram that illustrates operation of the invention in an example scenario.

FIG. 2 is an event diagram that illustrates operation of the invention in an example scenario. The example involves nodes 1, 2, and 3, where node 1 initiates a store operation for address x, node 2 has a cached copy of address x, and node 3 is the home to the address x.

When the processor of node 1 first attempts to store to address x, address x is not present in the node 1 caches. In response to the cache-miss condition, the memory controller at node 1 sends a request to node 3. The memory controller at node 1 uses the desired cache-line's address to determine that node 3 is the home node.

At node 3, the memory controller checks its directory information and finds that the cache line for address x is already cached for reading at the processor of node 2 and determines that the cache line is to be kept coherent using an update strategy. A copy of the cache-line, together with a code indicating update coherence, is sent back to node 1. The memory controller at node 3 updates its directory entry for address x to include the latest cache information.

The directory generally keeps information related to where a cache-line is cached and in what manner. The directory is consulted whenever a request to the relevant cache-line arrives at the cache line's home node. The content of the directory together with the request type determines the action needed. For example, during the update process the node initiating an update sends an update message to the home node, which uses the content of the relevant directory entry to identify the other nodes needing to receive the update.

In another embodiment, the node also maintains information that is used in determining whether to use an update-based or invalidation-based approach to cache coherence.

At node 1, the reply is handled by entering the newly obtained cache line in the L3 cache of node 1. The cache line is further provided to the processor-cache complex of node 1, thus completing the processor-cache complex's cache-miss processing. Furthermore, because the cache-line is obtained for store purposes and is to be kept coherent using an update approach, the write-back trigger 116 of node 1 records the cache-line address in an update_pending queue 124. Any cache-line that has been obtained with write permission and for which coherence is maintained using an update protocol has an associated entry added to the update_pending queue.

In one embodiment, each entry in the update-pending queue contains the address bits of the cache-line minus the lower-order bits that index into the cache-lines. The bits that are stored depend on the implementation requirements, but the selected bits must allow reconstruction of the cache line address.

After some further processing at node 1, the cache line containing address x is written-back by the processor-cache arrangement of node 1. A write-back of data is initiated in response to any one of a number of conditions. For example, a write-back is initiated for a cache line if the cache space occupied by the cache line is needed to store a copy of a different memory location. In another example, some processor families also enable software to explicitly force write-backs and also to purge a cache-line from its caches.

In another embodiment, the write-back trigger of node 1 initiates write-back operations. With respect to a weak memory model, the write-back trigger must force a write-back of every cache-line in its update-pending queue when it receives a synchronization operation from the processor in its node. Propagation of the synchronization operation to another node cannot precede propagation of the updates resulting from the writing back of the cache-lines referenced in the update-pending queue of node 1. Other conditions under which write-back is initiated are described in association with FIG. 4.

Generally, a write-back may either leave no copy of a cache line in the processor-cache complex, it may leave a read-only copy, or it may leave a read-and-write copy. When a write-back is triggered from outside the processor-cache complex, different bus operations are typically available to achieve any of these three results. The write-back trigger will generally only use those bus operations that leave no copy or leave a read-only copy. This allows the write-back trigger to then remove the entry for the cache-line concerned from its update_pending queue. If the processor-cache complex attempts to write the cache-line again, it will have to re-obtain write-permission, and in response the write-back trigger re-enters the cache-line address into the update_pending queue. In another embodiment, write-permission to the cache line is retained in the L3 cache so that re-obtaining write-permission by the processor-cache complex can be satisfied at the requesting node.

The write-back trigger of node 1 initiates the generation of difference data when a write-back occurs for a cache line and the cache line is in the update-pending queue. The difference generator obtains the original copy of the cache line as stored in the L3 cache at node 1, and at the same time writes back to the L3 cache the new cache line data supplied in the write-back operation. The difference generator of node 1 compares the original cache line and the new cache line and reports the difference data to node 3. The difference data indicates which parts of the cache line have been modified and specifies the new data. Thus, the updates to multiple addresses in the cache line are reported in one update message to the home node.

The difference data are reported to node 3, which looks up in its directory the node(s) having cached address x. The difference data are then distributed to node 2.

Upon receiving an update message, node 2 activates its difference integrator, which purges any copy of the referenced data from the processor-cache complex. The copy of the referenced data in the L3 cache is then updated. Should node 2 attempt to again read the cache line, a cache-miss condition will occur in the in the processor-level cache (L1, L2). However, the cache line will be present in the L3 cache, and node 2 will have available the updated information.

In another embodiment, the difference data are distributed by way of a circular linked list that links the nodes having copies of the referenced cache line. The difference data are sent from one node to the next as indicated by the nodes on the circular linked list.

Figure 3:
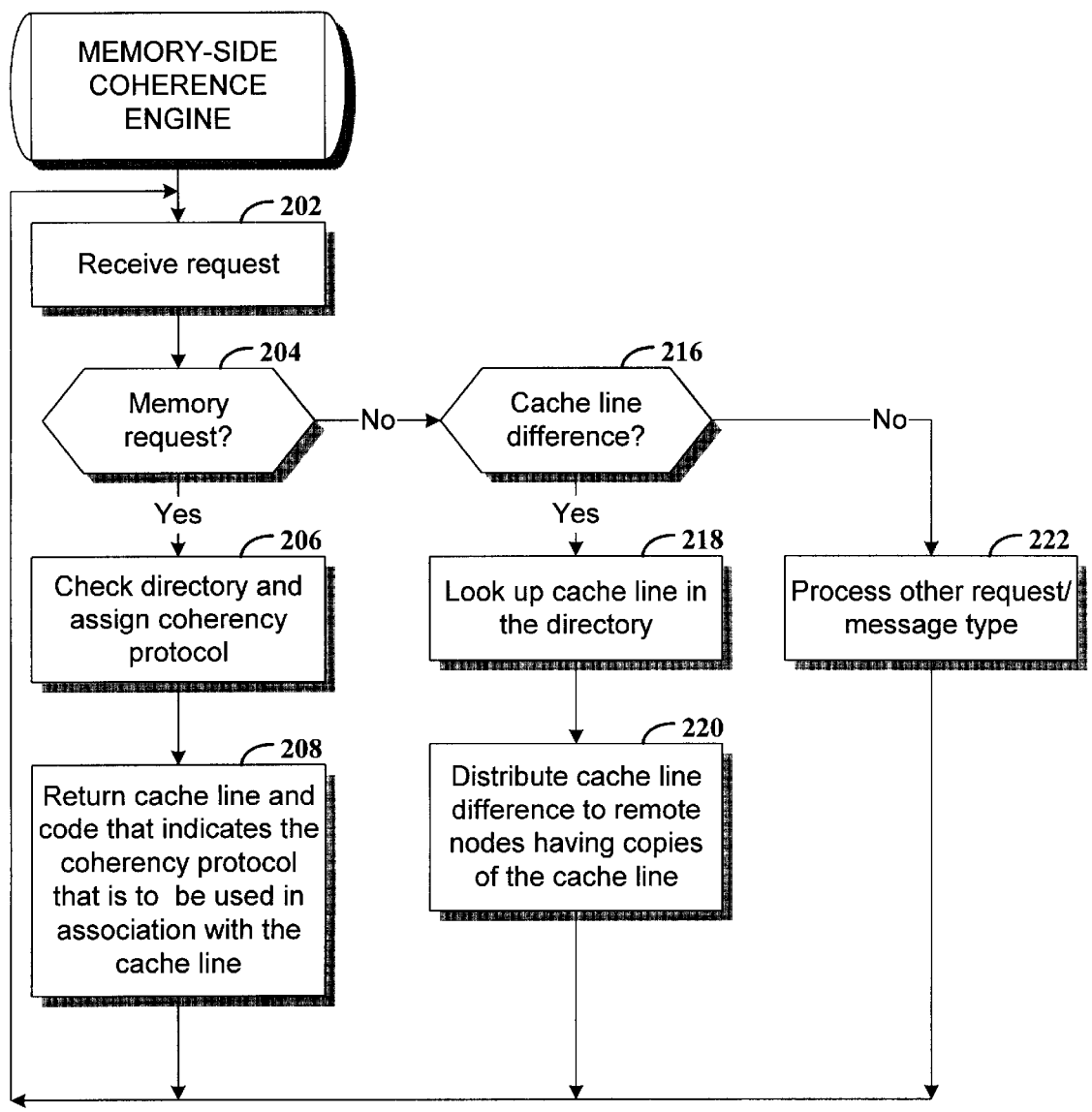
FIG. 3 is a flowchart of an example process performed by a memory-side coherence engine.

FIG. 3 is a flowchart of an example process performed by the memory-side coherence engine in accordance with one embodiment of the invention. The memory-side coherence engine generally handles memory requests for addresses that are hosted by the node on which the engine is operating.

At step 202 a request is received. If the request is a memory request, decision step 204 directs the process to step 206, where the memory-side coherence engine checks its directory for the requested address. The directory is used to maintain information for addresses hosted by the node of the memory-side coherence engine and that are cached by one or more nodes in the system. The directory information includes for each address, for example, the identities of the nodes having cached the address, read and write permissions for the address, and a cache coherence code that indicates the protocol (update or invalidation) to be used with the address.

At step 206, the memory-side coherence engine assigns a coherency protocol based on information in the directory. A number of policies for selecting coherence protocols or deciding when to switch from one protocol to another are available for different implementation requirements. For example, one policy initially selects an update approach if permission to write a cache-line is requested when the cache-line is also cached at other nodes, but selects an invalidation protocol if there are no other cached copies. Each cache-side engine tracks the local usage of a cache-line between updates. If there has been no usage after a number of updates, the cache-side engine purges its copy, in effect invalidating it. The memory-side coherence engine is notified when this happens. If eventually all cache copies other than that at a writer node are purged, coherence for the sole cache copy should then be maintained using an invalidation approach. For deciding when to transition from the invalidation to the update protocol, the memory-side coherence engine tracks the frequency at which cache-lines are invalidated and then re-fetched. When invalidation and re-fetching occur frequently for a cache line, the coherence protocol for that line is switched from invalidation to update.

At step 208, a cache line containing the requested address is returned to the requesting node, along with a code that indicates the cache coherence protocol. The process then returns to step 202 to receive another request.

When the memory-side coherence engine receives difference data for a cache line, decision step 216 directs the process to step 218 to obtain from the directory the information associated with the cache line. The information of interest identifies the nodes that have cached copies of the cache line. At step 220, the difference data are distributed in an update message to the identified nodes. The process then returns to step 202.

In another embodiment, the difference data are distributed by way of a circular linked list that links the nodes having copies of the referenced cache line. The difference data are sent from one node to the next as indicated by the nodes on the circular linked list. Thus, in this alternative embodiment the home node need not be involved in determining which nodes have the cache line.

At step 222, the memory-side coherence engine processes other types of requests. For example, an implementation may choose to notify the memory-side coherence engine when a cache-line is completely purged. In response, the memory-side coherence engine clears the associated information from its directory.

Figure 4:
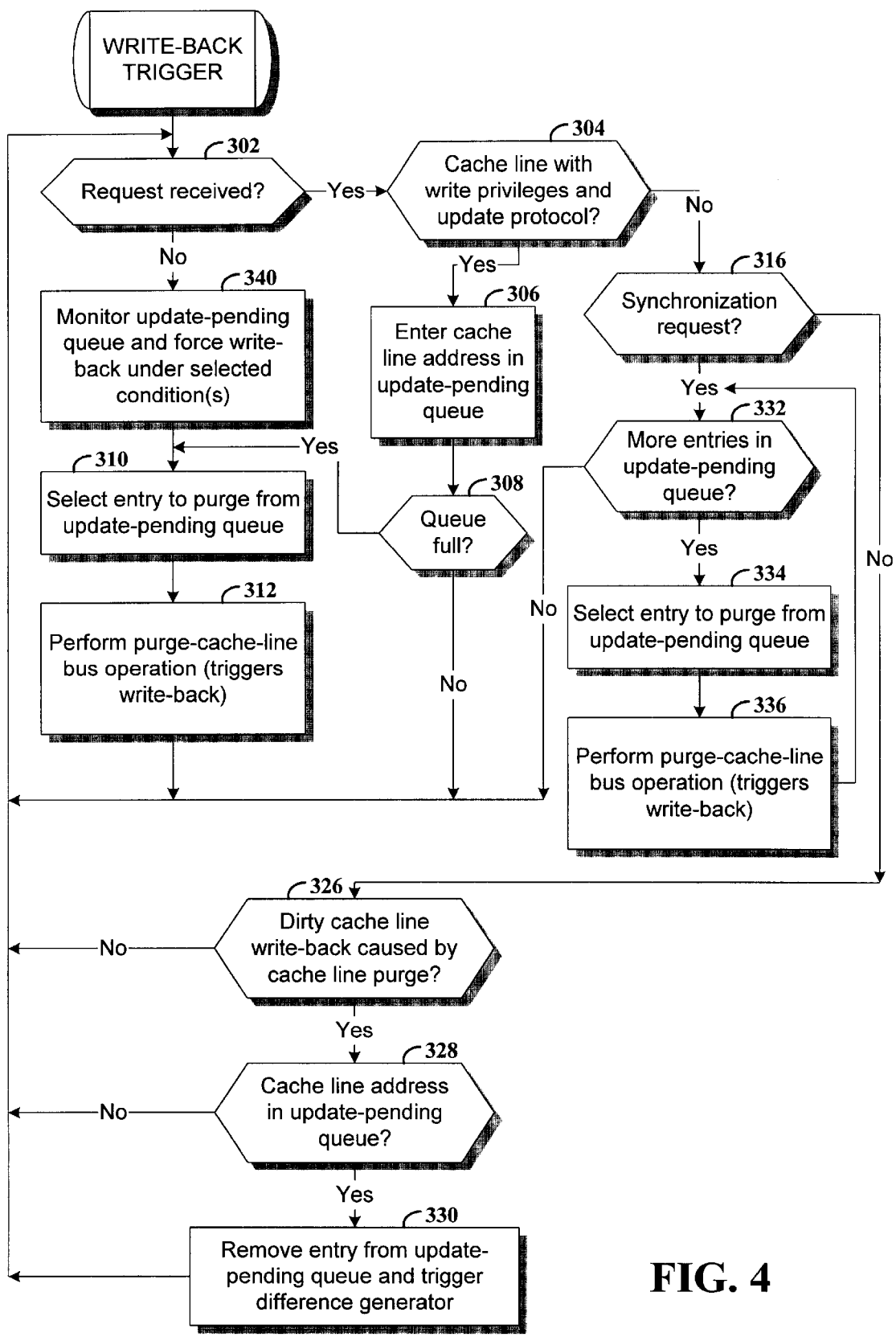
FIG. 4 is a flowchart of an example process performed by a write-back trigger.

FIG. 4 is a flowchart of an example process performed by the write-back trigger in accordance with one embodiment of the invention. The write-back trigger generally controls the update-pending queue and the process of initiating writing cache lines back to the memory of the home node. Write-back operations are initiated, for example, in response to a full update-pending queue, software performing a synchronization operation, and the write-back trigger monitoring the update-pending queue.

When a request is received, such as a cache line (with write privileges and subject to the update protocol) or a synchronization request, decision step 302 directs the process to decision step 304. Decision step 304 directs the process to step 306 if the node hosting the write-back trigger received a cache line having write privileges and subject to the cache update protocol. At step 306, an entry is added to the update-pending queue for the newly received cache line. If the update-pending queue is then full, decision step 308 directs the process to step 310, where an entry is selected to purge from the queue. Example implementations for the selection of an entry include a least-recently-used process or a first-in-first-out process. At step 312, a purge-cache-line bus operation is performed for the selected cache line. The purge bus operation is a write-back request signal issued from the write-back trigger to the processor-cache arrangement 102. This triggers a write-back for the cache line if the processor 102 has the referenced address cached. Control is returned to decision step 302.

When the write-back trigger receives a request that is a write-back operation, such as triggered by a purge (step 310), the process is directed via decision steps 302, 304, 316, and 326 to decision step 328. The write-back operation's address identifies the cache line being written back. If the referenced cache line has an associated entry in the update-pending queue, decision step 328 directs the process to step 330. At step 330, the entry that corresponds to the cache line is removed from the update-pending queue and the difference generator is triggered. The process then returns to decision step 302 to wait for another request.

Synchronization requests also trigger write-back operations. For a synchronization request, the process is directed via decision steps 302, 304, and 316 to decision step 332, which controls a process loop for purging entries from the update-pending queue. As long as there are more entries in the update-pending queue, the process is directed to step 334. Step 334 selects an entry from the update pending queue to purge, as described for step 310. Step 336 then performs a purge-cache-line bus operation. The purge operation is a write-back request signal issued from the write-back trigger to the processor-cache arrangement 102. The process then returns to decision step 332.

The write-back trigger process also monitors at step 340 the update-pending queue while waiting for a request to be received. One reason for monitoring the update-pending queue is to reduce the number of write-back operations needed when a synchronization operation occurs. This can be accomplished by initiating a write-back operation prior to a synchronization operation. This will reduce the latency experienced by a synchronization operation and may result in better performance. For some applications, all the store operations to a cache line are likely to occur in a short time span after write permission is obtained. The write-back trigger may thus choose to continually purge entries from its update-pending queue after waiting a selected period of time after each entry is entered into the queue. In an example embodiment, the entries in the update-pending queue are time stamped.

Figure 5:
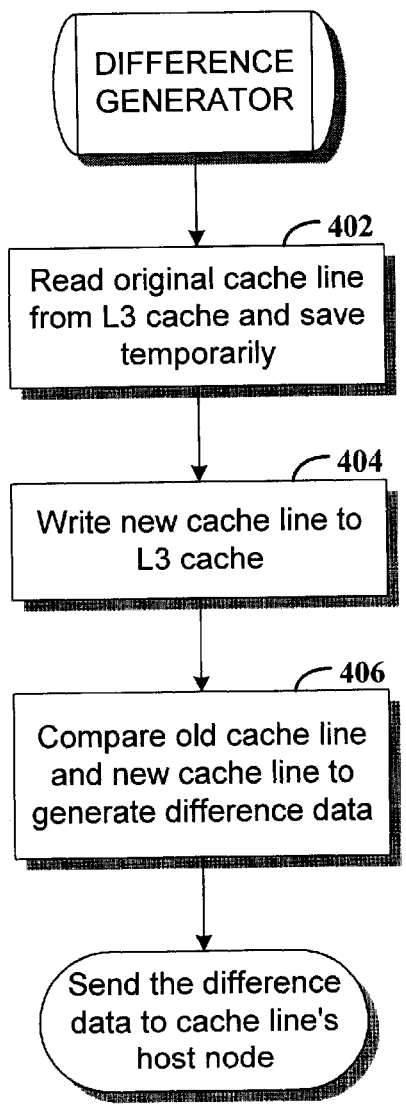
FIG. 5 is a flowchart of an example process for generating difference data.

FIG. 5 is a flowchart of an example process for generating difference data in accordance with one embodiment of the invention. The difference generator is initiated when a write-back operation is observed from the write-back trigger. The process generally compares the updated version of the cache line to an old version of the cache line, which is available in a lower-level cache, and reports the differences to the home node.

At step 402, the process reads the original version of the cache line from the next lower-level cache, for example, the L3 cache, and at the same time at step 404 writes the new cache line data to the next lower-level cache. Step 406 compares the original cache line to the new cache line, and step 408 sends the difference data to the node that hosts the cache line.

Figure 6:
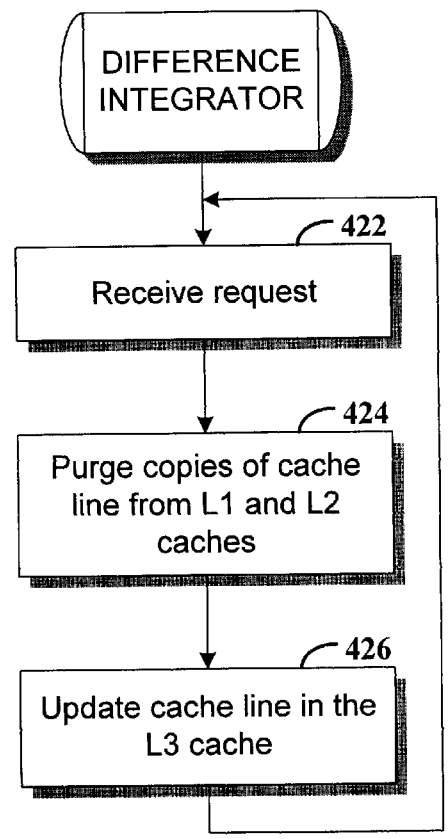
FIG. 6 is a flowchart of an example process performed by a difference integrator.

FIG. 6 is a flowchart of an example process performed by the difference integrator in accordance with one embodiment of the invention. The difference integrator process is initiated at a node that has a cached version of a cache line when the cache-side coherence engine at the node receives an update message from the node that hosts the cache line. The process receives a request at step 422, and at step 424 purges copies of the cache line from the L1 and L2 caches. At step 426, the cache line in the L3 cache is updated with the difference data contained in the update message. Thus, the next time the node issues an access request for data in the cache line, the latest version of the cache line will be available in the L3 cache.

The embodiments described above assume a cache hierarchy that includes an L3 cache that is implemented in main memory and that stores data fetched from remote nodes. This structure allows the cache-side coherence engine 114 and memory-side coherence engine 112 to be incorporated in the memory controller 106 in conjunction with a "commodity" processor that supports only an invalidation-based cache-coherence protocol.

In an alternative embodiment, the invention can be implemented between the L1 and L2 caches of a processor. In many implementations, the L2 cache contains a superset of the data in the L1 cache, and modifications are typically written only to the copy in the L1 cache at the time of a write operation. Data are written-back to the L2 cache at a later time. In the alternative embodiment, the L2 functions similar to the L3 cache in the embodiment of FIG. 1. In the alternative embodiment, the cache-side coherence engine is implemented with the L2 cache controller.

In general, the present invention is applicable in any system with a cache hierarchy where some level(s) in the hierarchy use the update protocol to keep a number of peer caches up-to-date. The invention needs two levels of cache: a higher level where a modification to a cache line is written and a lower level where the original version of the cache line is kept. The embodiments described herein illustrate a coherence maintenance approach whereby the higher-level caches, particularly those implemented in the microprocessor chip, support only invalidation-based coherence protocol while the lower-level caches implement among other things, update-based coherence protocol. The embodiments illustrate how these two types of protocols are used together in the same system where the lower and higher-level caches interact with each other. Working together, system-wide memory coherence is maintained.

The present invention is applicable to both bus-based systems and to systems in which processing nodes are directly coupled. In a bus-based system, the write-back trigger and difference generator function in the manner described above. The difference integrator, however, depends on snooper logic to determine whether an update broadcast is relevant to its processor-cache complex.

The present invention is suitable for use in cache hierarchies where an update protocol is used exclusively as well as in cache hierarchies where an update protocol is used in combination with an invalidation protocol. In an example system where a combination of update and invalidation protocols are used, a certain address range(s) is subject to the update protocol, and another address range(s) to the invalidation protocol. In another example system where a combination of update and invalidation protocols are used, run-time statistics on data usage and sharing pattern is gathered for each cache-line and/on memory page and used to make dynamic decisions about protocol choice.

What is claimed is:

1. A cache memory arrangement for a shared memory system including storage implemented on a plurality of intercoupled processing nodes, comprising at each node:

a higher-level cache and a lower-level cache, wherein the higher and lower-level caches include respective pluralities of cache lines and the higher-level cache checks for presence of a requested address before conditionally presenting the requested address to the lower-level cache;

a coherence controller coupled to the higher and lower-level caches and to the storage elements, the coherence controller configured to maintain cache coherency for the higher-level cache consistent with an invalidation-based cache coherence protocol while maintaining cache coherency for the lower-level cache consistent with an update-based cache coherence protocol.

2. The arrangement of claim 1, wherein the higher-level cache is a first-level cache, and the lower-level cache is a second-level cache.

3. The arrangement of claim 1, wherein the higher-level cache is a second-level cache, and the lower-level cache is a third-level cache.

4. The arrangement of claim 1, wherein the coherence controller is configured to generate a write-back request signal to the higher-level cache in response to receipt of a cache synchronization signal, the write-back request signal including an address, and the higher-level cache configured to generate a write-back operation signal in response to the write-back request signal if the address in the write-back request signal is present in the higher-level cache.

5. A method for cache management in a shared memory system implemented on a plurality of intercoupled processing nodes, each processing node including a higher-level cache and a lower-level cache having corresponding cache lines, comprising:

maintaining cache coherency for the higher-level cache consistent with an invalidation-based cache coherence protocol; while
maintaining cache coherency for the lower-level cache consistent with an update-based cache coherence protocol.

6. The method of claim 5, further comprising:

in response to a write-back operation referencing an address cached at a node, generating difference data that specifies differences between data in a cache line for the address in the higher-level cache and data in a corresponding cache line in the lower-level cache; and providing the difference data to one or more other nodes with cached versions of the cache line for the address.

7. The method of claim 6, further comprising in response to receipt of the difference data at a node, purging a version of the cache line from the higher-level cache at the node and updating a version of the cache line in the lower-level cache at a node.

8. An apparatus for cache management in a shared memory system implemented on a plurality of intercoupled processing nodes, each processing node including a higher-level cache and a lower-level cache having corresponding cache lines, comprising:

means for maintaining cache coherency for the higher-level cache consistent with an invalidation-based cache coherence protocol; while maintaining cache coherency for the lower-level cache consistent with an update-based cache coherence protocol.

9. A cache memory arrangement for a shared memory system implemented on a plurality of intercoupled processing nodes, comprising at each node:
a higher-level cache and a lower-level cache, wherein the higher and lower-level caches include respective pluralities of cache lines and the higher-level cache checks for presence of a requested address before conditionally presenting the requested address to the lower-level cache;
a plurality of storage elements for storage of update-state information of the cache lines in the higher-level cache;
a coherence controller coupled to the higher and lower-level caches and to the storage elements, the coherence controller configured to,
generate a cache-line-fetch request with write permission for a requested address in a store operation if the requested address is not present in the lower-level cache,
in response to data received for the cache-line-fetch request with write permission, store update-state information in one of the storage elements associated with the cache-line of the requested address, and
in response to a write-back operation signal, clear the update-state information associated with the cache line, generate difference data that specifies differences between data in a cache line referenced by the cache-line code in the higher-level cache and data in a corresponding cache line in the lower-level cache, and provide the difference data to one more nodes with cached versions of the cache line.

10. The arrangement of claim 9, wherein the plurality of storage elements are respectively associated with the cache lines in the higher-level cache.

11. The arrangement of claim 9, wherein the higher-level cache is a first-level cache, and the lower-level cache is a second-level cache.

12. The arrangement of claim 9, wherein the higher-level cache is a second-level cache, and the lower-level cache is a third-level cache.

13. A cache memory arrangement for a shared memory system implemented on a plurality of intercoupled processing nodes, comprising at each node:
a higher-level cache and a lower-level cache, wherein the higher and lower-level caches include respective pluralities of cache lines and the higher-level cache checks for presence of a requested address before conditionally presenting the requested address to the lower-level cache;
an update-pending queue, each entry in the update-pending queue identifying a cache line in the higher-level cache;
a coherence controller coupled to the higher and lower-level caches and to the update-pending queue, the coherence controller configured to,
in response to a memory-write cache-line fetch request received from a requester processing node, the memory-write cache-line fetch request including a requested address, provide a cache line with the requested address to the requester node,
in response to a receipt of a cache line with write permission for a requested address, enter a cache-line code that identifies the cache line of the requested address in the update-pending queue,
in response to a write-back operation signal, remove a cache-line code from the update-pending queue, generate difference data that specifies differences between data in the higher-level cache for a cache line referenced by the cache-line code and a corresponding cache line in the lower-level cache, and provide the difference data to a home node that hosts the cache line, and
in response to receipt of difference data, distribute the difference data to one or more nodes having cached versions of the associated cache line.

14. The arrangement of claim 13, wherein the difference data includes data that identifies which addresses have modified data and associated modified data.

15. The arrangement of claim 13, wherein the lower-level cache is implemented with DRAM and the coherence controller is further configured to read from the lower-level cache, the cache line corresponding to the cache-line code, and simultaneously write the cache line from the higher-level cache and referenced by the cache-line code to the lower-level cache.

16. The arrangement of claim 13, wherein the higher-level cache is a first-level cache, and the lower-level cache is a second-level cache.

17. The arrangement of claim 13, wherein the higher-level cache is a second-level cache, and the lower-level cache is a third-level cache.

18. The arrangement of claim 13, wherein the coherence controller is configured to generate a write-back request signal to the higher-level cache when the update-pending queue is full, the write-back request signal including an address, and the higher-level cache is configured to generate a write-back operation signal in response to the write-back request signal if the address in the write-back request signal is present in the higher-level cache.

19. The arrangement of claim 13, wherein the coherence controller is configured to generate a write-back request signal to the higher-level cache when an associated entry in the update-pending queue is to be replaced, the write-back request signal including an address, and the higher-level cache is configured to generate a write-back operation signal in response to the write-back request signal if the address in the write-back request signal is present in the higher-level cache.

20. The arrangement of claim 13, wherein the coherence controller is configured to generate a write-back request signal to the higher-level cache in response to receipt of a cache synchronization signal, the write-back request signal including an address, and the higher-level cache is configured to generate a write-back operation signal in response to the write-back request signal if the address in the write-back request signal is present in the higher-level cache.

21. The arrangement of claim 13, wherein the coherence controller is configured to generate the write-back request signal to the higher-level cache for a particular entry in the update-pending queue after passage of a selected period of time following placement of the entry in the update-pending queue, the write-back request signal including an address, and the higher-level cache is configured to generate a write-back operation signal in response to the write-back request signal if the address in the write-back request signal is present in the higher-level cache.

22. A method for cache management in a shared memory system implemented on a plurality of intercoupled processing nodes, each processing node including a higher-level cache and a lower-level cache having corresponding cache lines, comprising:

maintaining update-state information in association with cache lines in the higher-level cache, wherein the update-state information for a cache line indicates pending updates from the node with a cached version of the cache line;

in response to a write-back operation referencing an address cached at a node, generating difference data that specifies differences between data in a cache line for the address in the higher-level cache and data in a corresponding cache line in the lower-level cache; and providing the difference data to one or more other nodes with cached versions of the cache line for the address.

23. The method of claim 22, further comprising in response to receipt of the difference data at a node, purging a version of the cache line from the higher-level cache at the node and updating a version of the cache line in the lower-level cache at a node.

24. The method of claim 23, wherein maintaining the update-state information comprises at each node, entering in an update-pending queue cache-line codes that identify cache lines cached with write permission at the node, and further comprising:

in response to the write-back operation, removing from the update-pending queue the cache-line code associated with the cache line for the address.

25. The method of claim 23, wherein the each memory address is hosted by a home node and further comprising:

providing the difference data to the home node; and distributing the difference data from the home node to the one or more other nodes.

26. The method of claim 25, further comprising selecting at each node that hosts a range of memory addresses, an update-based or invalidation-based cache coherence protocol for each address requested with write permission, wherein the update-state information for a cache line indicates write permission at the node with a cached version of the cache line with update-based cache coherence protocol.

27. The method of claim 26, further comprising maintaining at each node that hosts a range of memory addresses, a directory having entries that identify cache lines that are cached in the hosted range of addresses, read-write permissions associated with the cache lines, and cache coherence protocols associated with the cache lines.

28. An apparatus for cache management in a shared memory system implemented on a plurality of intercoupled processing nodes, each processing node including a higher-level cache and a lower-level cache having corresponding cache lines, comprising:

means for maintaining update-state information in association with cache lines in the higher-level cache, wherein the update-state information for a cache line indicates pending updates from the node with a cached version of the cache line;

means, responsive to a write-back operation referencing an address cached at a node, for generating difference data that specifies differences between data in a cache line for the address in the higher-level cache and data in a corresponding cache line in the lower-level cache; and means for providing the difference data to one or more other nodes with cached versions of the cache line for the address.

* * * * *